May 5, 1931.  E. E. EINFELDT  1,803,427
TRACTION WHEEL CONSTRUCTION
Filed Sept. 24, 1929    2 Sheets-Sheet 1
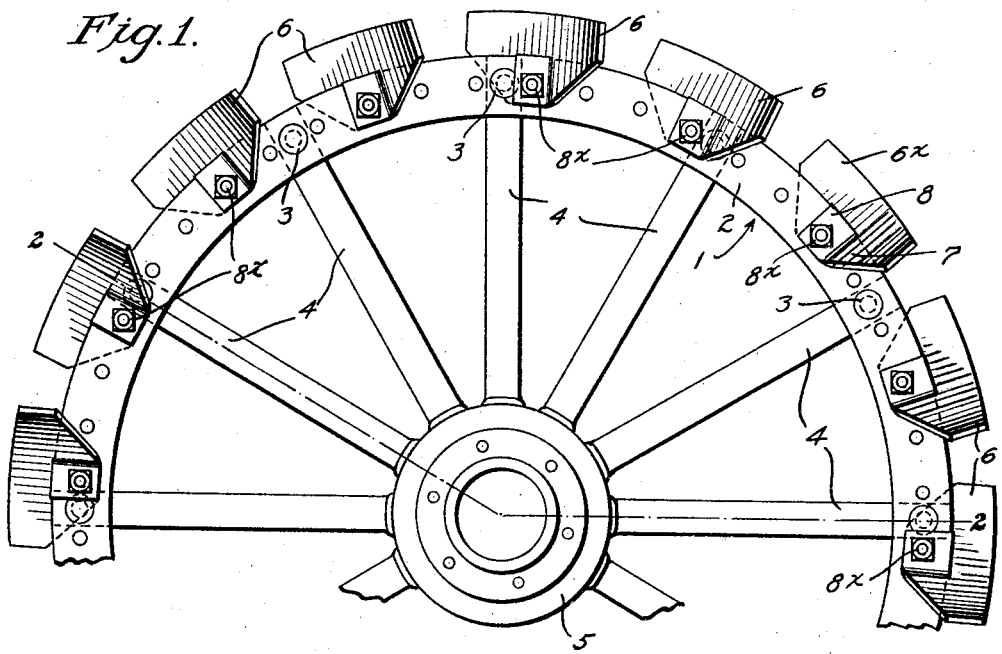
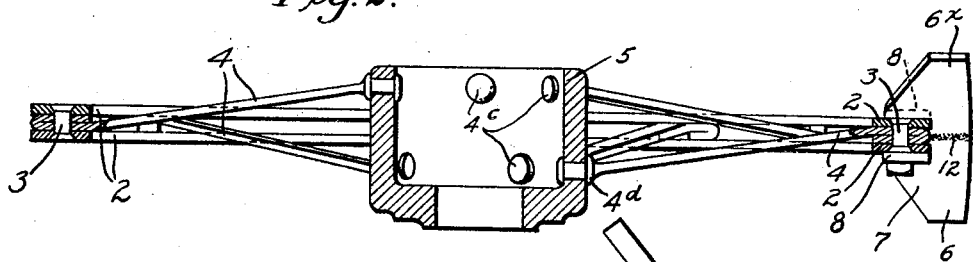
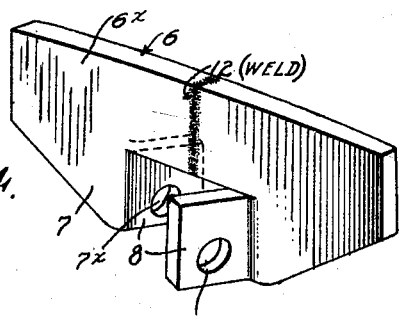
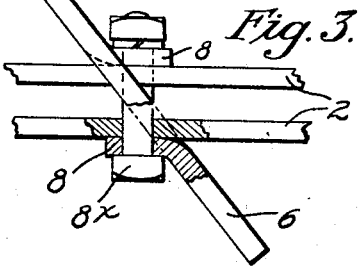
INVENTOR
Ernest E. Einfeldt
BY Morrison, Kennedy & Campbell
ATTORNEYS.

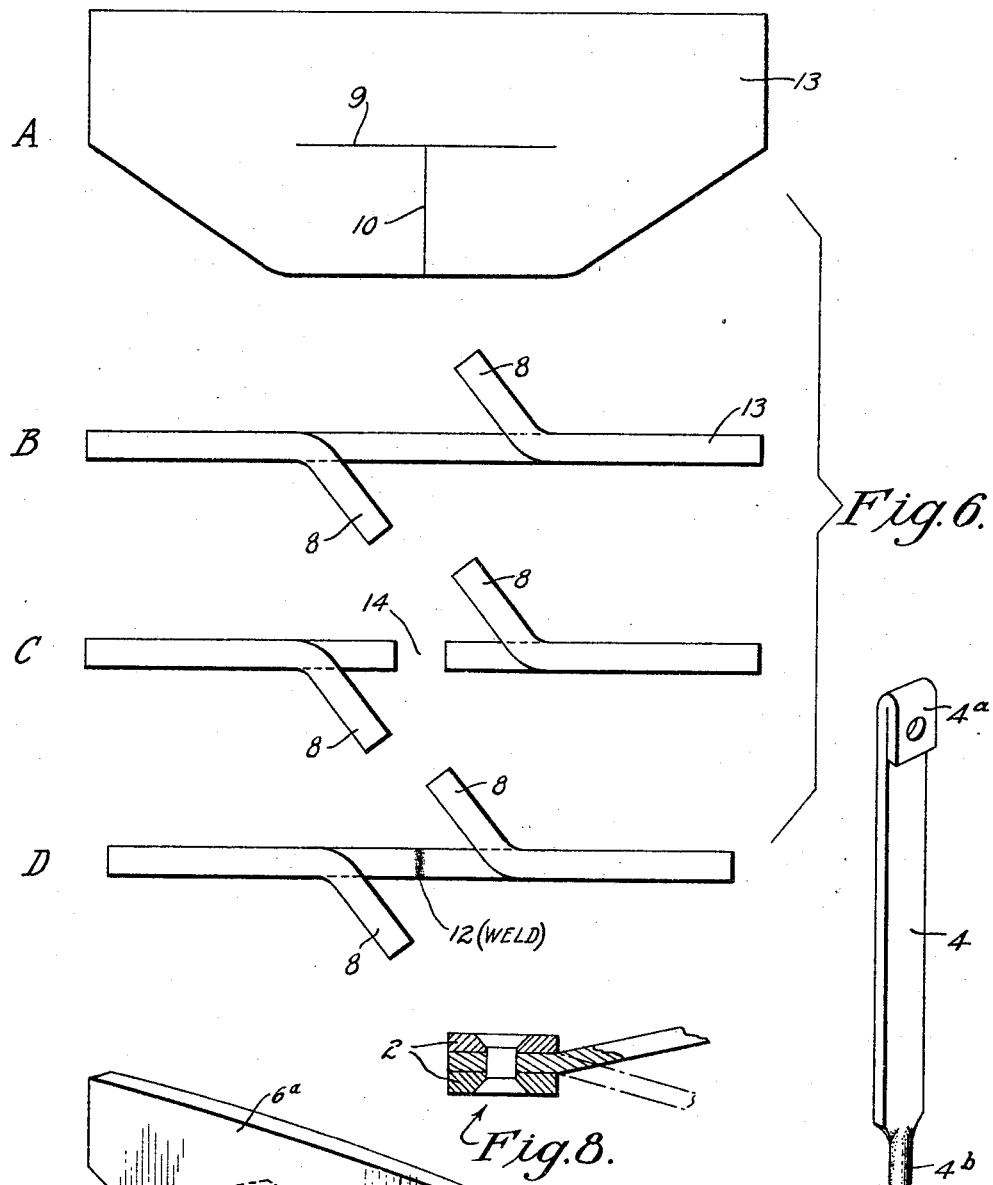

Patented May 5, 1931

1,803,427

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

TRACTION-WHEEL CONSTRUCTION

Application filed September 24, 1929. Serial No. 394,771.

This invention relates to wheel structures, and is concerned more particularly with traction wheels of the type in which the rim member is made up of one or more flat annular plates connected to the spokes in such a manner that the edges of the plates will be presented to contact with the ground, thereby forming a tread surface which in the action of the wheel will reduce the packing of the ground to a minimum. In connection with a wheel, preferably of this type, a traction cleat of improved form and construction is employed comprising a flat plate provided with fastening lips extending from the inner portion of the plate, and disposed opposite to each other in spaced overlapping relations, so that in fastening the cleats to the rim member of the wheel, the lips may be seated against the sides of the rim member and may be firmly fastened thereto to secure the cleats in position, by bolts passing through the alined bolt holes in the lips and through the intervening rim member.

In the specification to follow, the invention will be described in detail, and the novel features thereof will be pointed out in the appended claims.

In the accompanying drawings:

Fig. 1 is a side elevation of a portion of a traction wheel having my invention embodied therein;

Fig. 2 is a transverse section on the line 2—2 of Fig. 1;

Fig. 3 is a fragmentary plan view partly in section, on an enlarged scale, of one of the cleats and the adjacent portion of the rim member to which it is attached;

Fig. 4 is a perspective view of one of the cleats constructed of sectional form to adapt the same for attachment to a rim member of relatively reduced thickness in an axial direction;

Fig. 5 is a perspective view of one of the flat spokes removed, showing the cylindrical formation of its inner end to enable it to be headed and shouldered in connecting it to the hub;

Fig. 6 is a view illustrating the several stages in the formation of the cleat of the form shown in Fig. 4;

Fig. 7 is a perspective view of a cleat of a different form adapted to a rim member of relatively greater thickness than that to which the cleat of Fig. 4 is applicable;

Fig. 8 is a fragmentary sectional view of a portion of the rim and outer end of the attached spoke, showing the latter in slightly modified form; and Fig. 9 is a similar view of another modification.

Referring to the drawings:

In the form of the wheel shown in Figs. 1 to 3, the rim member 1 consists of two rim sections in the form of flat annular plates 2 connected fixedly together side by side in spaced relations, in the present instance by means of rivets 3 extending through the plates and through the outer folded ends of spokes 4, seated between the rim sections, and which spokes are connected at their inner ends to a hub shell 5. In the wheel thus formed, the edges of the annular plates forming the tread surface, will be presented to contact with the surface of the ground, and will therefore reduce the packing of the ground to a minimum.

The spokes as best shown in Figs. 2 and 5, are each formed from a flat strip or plate, the outer end of which is folded back on itself as at 4ª, thereby producing two thicknesses of the material, which being seated between the annular plates 2 of the rim member and being fastened thereto by rivets 3 as heretofore mentioned, will act to space the plates of the rim member, while affording a solid contact of the plates with the sides of the folded end of spoke. The folds of the several spokes are arranged alternately to the right and left, as best shown in Fig. 2, and from these folded ends the spokes extend alternately at opposite inclinations to the hub shell to which their inner ends are connected in two rows or ranks and in staggered relations. To adapt the flat spokes for secure and rigid attachment to the hub shell, their inner ends are forged into cylindrical or rounded form in cross section as at $4^b$ in Fig. 5, and these rounded ends are inserted through holes in the flange of the hub shell and fastened thereto by heads $4^c$ on the inner ends of the spokes bearing against the inner side of the hub flange and shoulders $4^d$ on the spokes bearing against the outer side of the hub flange.

Instead of spacing the annular plates of the rim member by the folded outer ends of the spokes as just described, these folds may be omitted and the annular plates may be seated against the opposite sides of a single thickness of spoke metal, and riveted thereto as shown in Fig. 8. In this case as in that previously described, the plates of the rim will be given firm and solid support by the flat spoke ends, and said plates will be uniformly spaced throughout their circumferential extent. Or the outer end of the flat spoke may be upset as at $4^e$, as shown in Fig. 9, to give it increased thickness for the proper spacing of the annular plates of the rim member.

Traction cleats 6 are applied at intervals around the tread surface of the rim, which cleats are each in the form of a flat plate, which in the form of the invention shown, are disposed obliquely to the plane of the wheel and parallel to each other; and as the form, construction and method of forming the several cleats are identical, a detailed description of one will suffice.

The outer portion $6^x$ of the cleat plate constituting the effective traction element, is rectangular in form, while the inner portion 7 is tapered at its ends and is provided with two lips 8 for fastening the cleat to the rim member. These lips are formed by incising the inner tapered portion of the plate along the longitudinal line 9 and the transverse intersecting line 10 as shown at view A, Fig. 6, and bending the separated lip portions of the metal stock outwardly in opposite directions from each other, so that the lips will be disposed opposite each other in spaced overlapping relations; and these lips are formed with alined bolt holes $7^x$ to receive a fastening bolt $8^x$. In applying the cleats thus formed to the wheel, the cleats are spaced at intervals around the rim member with the lips of the respective cleats extending on opposite sides thereof, and the cleats are fastened in place by means of the fastening bolts, which extend through the alined openings in the fastening lips and through the intervening rim member.

Where the rim member is of relatively reduced thickness in an axial direction, as for instance as shown in Figs. 2, 8 and 9, the mere incising of the plate as described to form the fastening lips, will not give a sufficient length of the lips to provide the necessary amount of material for a fastening bolt large enough to secure the cleats effectively in position, and to meet this condition I propose to construct the cleats of the sectional form shown in Fig. 4, and in the manner illustrated in Fig. 6. In Fig. 4, it will be seen that the cleat consists of two complementary end sections welded together at their inner ends in a common plane on the line 12, each of which plates is provided with a fastening lip 8, and which lips are disposed opposite each other in spaced overlapping relations and are of a length when disposed in the plane of the plate to intersect the said line 12.

In constructing a cleat of this form, a blank 13 of the form shown in view A, Fig. 6, is provided, which blank is incised along the longitudinal line 9 and the central transverse intersecting line 10, before referred to. The separated portions of the metal stock of the blank are now bent outwardly from each other in opposite directions, thereby forming the fastening lips 8 as shown in view B, Fig. 6. Next, a section of the intact portion of the blank between the lips is removed, as shown by the space 14 in view C, so as to divide the blank into two complementary parts, and finally these parts are brought together and welded at their ends along the central line 12, whereby an increased length of the lips is secured which will give plenty of room for a sufficiently large bolt to fasten the cleat in position on the rim member of the wheel.

In cases on the other hand where the thickness of the rim member is relatively greater, it will not be necessary in order to secure the requisite length of fastening lips, to make the cleat in sectional form as described, since such length of lips $8^a$ may be secured by simply incising the blank as shown in view A of Fig. 6, and bending the incised portions outwardly from the inner portion $7^a$, the cleat $6^a$ in this instance, and as shown in Fig. 7, being of non-sectional form without the welded joint above described.

It will be observed that in both forms of the cleat as illustrated respectively in Figs. 4 and 7, the fastening lips extend in planes angularly related to the plane of the cleat plate; and when the cleats are disposed in oblique relations to the plane of the wheel as illustrated, the planes of the lips will extend obliquely in relation to the plane of the cleat plates.

Instead of being made of two spaced annular plates as hereinbefore described, the rim may be made of a single annular plate, to one side of which the outer ends of the spokes are connected so as to present the edge or tread surface of the annular plate to contact with the surface of the ground.

Among the advantages incident to a traction wheel constructed as above set forth, are the following:—

The fastening lips being integral with the cleat plate and disposed in planes parallel with the plane of the wheel, afford the fastening means of the maximum strength and solidity in the attachment of the cleats to the rim member, and effect the greatest saving in the material employed. The rim member being in the form of an annular plate or plates connected to the spokes so as to present their edge or edges to contact with the surface of the ground, reduces the packing of the ground to a minimum; and in the operation of the wheel in its travel over the ground, such reduction of the packing of the soil is aided by the form and disposition of the cleats, which on leaving the ground will carry a minimum amount of dirt, and will clean themselves automatically to the maximum degree.

In the foregoing description and accompanying drawings I have set forth the invention in the particular detailed form and arrangement of the parts which I deem best suited for the accomplishment of the ends in view. It will be understood however, that these details may be variously changed and modified without departing from the spirit of the invention; and further it will be understood that the invention is not limited to any particular form or construction of the parts, except in so far as such limitations are specified in the claims.

Having thus described my invention, what I claim is:—

1. An improved cleat for a traction wheel comprising two plates welded together at their inner ends in a common plane, each plate being provided at one edge with a fastening lip extending outwardly from the plate, and said lips being extended in opposite directions from each other and disposed in spaced overlapping relations in planes angularly related to the plane of the plate, and said lips being provided with alined bolt holes to receive a fastening bolt for securing the cleat in position.

2. An improved cleat for a traction wheel comprising a plate formed at one edge with fastening lips extending outwardly from each other in opposite directions and disposed in spaced overlapping relations, said lips being provided with alined bolt holes to receive a fastening bolt and being of a length when disposed in the plane of the plate, to intersect a medial line extending at right angles to the plate.

3. The improved cleat for a traction wheel, comprising a sheet metal plate provided between its edges with a longitudinal incision, and having the portions of the material inward of said incision and on opposite sides of a transverse line intersecting said incision, extending outwardly in opposite directions from the body of the plate to form fastening lips, said lips being disposed in overlapping relation to each other, and each lip being connected at its inner edge only to the plate and being disposed on one side only of said plate, and said lips being provided with holes for fastening the cleat to a wheel rim.

In testimony whereof, this specification has been duly signed by:

ERNEST E. EINFELDT.